US008513825B2

(12) United States Patent
Suzuki

(10) Patent No.: US 8,513,825 B2
(45) Date of Patent: Aug. 20, 2013

(54) ENGINE STARTING SYSTEM WITH HIGH- AND LOW-SPEED MODES OF MOTOR OPERATION

(75) Inventor: Yoshiaki Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 380 days.

(21) Appl. No.: 13/043,941

(22) Filed: Mar. 9, 2011

(65) Prior Publication Data

US 2011/0221210 A1 Sep. 15, 2011

(30) Foreign Application Priority Data

Mar. 10, 2010 (JP) ................................ 2010-052897

(51) Int. Cl.

| | |
|---|---|
| ***F02N 11/00*** | (2006.01) |
| ***H02P 9/04*** | (2006.01) |
| *G06F 7/00* | (2006.01) |
| *G06F 17/00* | (2006.01) |
| *G06F 19/00* | (2011.01) |

(52) U.S. Cl.

USPC .......................................... 290/38 R; 701/54

(58) Field of Classification Search

USPC .......................................... 290/38 R; 701/54

See application file for complete search history.

(56) References Cited

U.S. PATENT DOCUMENTS

| | | | | |
|---|---|---|---|---|
| 3,702,959 | A * | 11/1972 | Le Gloan | 318/139 |
| 6,545,852 | B1 * | 4/2003 | Arnold | 361/160 |
| 6,938,599 | B2 * | 9/2005 | Senda et al. | 123/179.3 |
| 7,077,092 | B2 * | 7/2006 | Senda et al. | 123/179.3 |
| 7,996,135 | B2 * | 8/2011 | Ishii et al. | 701/54 |
| 8,305,169 | B2 * | 11/2012 | Suzuki et al. | 335/126 |
| 2008/0162007 | A1 * | 7/2008 | Ishii et al. | 701/54 |
| 2010/0033276 | A1 * | 2/2010 | Niimi et al. | 335/202 |
| 2010/0264765 | A1 * | 10/2010 | Haruno et al. | 310/71 |
| 2011/0140813 | A1 * | 6/2011 | Suzuki et al. | 335/156 |
| 2011/0198862 | A1 * | 8/2011 | Yamada | 290/38 R |
| 2012/0032453 | A1 * | 2/2012 | Nakamura | 290/38 R |
| 2012/0162847 | A1 * | 6/2012 | Suzuki et al. | 361/206 |

FOREIGN PATENT DOCUMENTS

| | | |
|---|---|---|
| EP | 2 128 426 A2 | 12/2009 |
| JP | A-2009-287459 | 12/2009 |

* cited by examiner

*Primary Examiner* — Pedro J Cuevas

(74) *Attorney, Agent, or Firm* — Oliff & Berridge, PLC

(57) ABSTRACT

An engine starting apparatus includes a first and a second power supply path extending from a battery to an electric motor to start an engine. An electromagnetic switch has main contacts disposed in the first power supply path. A resistor is disposed in the second power supply path. A motor relay has relay contacts disposed in series with the resistor. A controller delays the time when the main contacts are closed to apply a full voltage of the battery to the motor until a given time lag has elapsed after the relay contacts are closed to supply electric current to the electric motor through the resistor. Specifically, when it is required to apply the full voltage to the motor to run the motor at a rated speed, the current does not pass through the relay contacts, thus resulting in no voltage drop, which ensures the stability in starting the engine.

8 Claims, 4 Drawing Sheets

ENGINE STARTING SYSTEM WITH HIGH- AND LOW-SPEED MODES OF MOTOR OPERATION

CROSS REFERENCE TO RELATED DOCUMENT

The present application claims the benefits of Japanese Patent Application No. 2010-52897 filed on Mar. 10, 2010, the disclosure of which is incorporated herein by reference.

BACKGROUND

1. Technical Field

The present invention relates generally to an engine starting apparatus which may be installed in automotive vehicles and is designed to switch between a first power supply path in which electric power is supplied to start an engine starting motor through a resistor and a second power supply path in which the electric power is supplied to the engine starting motor without passing through the resistor after the start of the engine starting motor.

2. Background Art

When an automotive engine is started using an engine starter equipped with an electric motor, that is, when main contacts are closed by an electromagnetic switch to supply electric current from a battery to turn on the motor, a heavy current called inrush current usually flows through the motor. This causes voltage at a terminal of the battery to drop greatly briefly which may result in shutdown of other electrical devices such as indicators or audio players installed in the vehicle which are to be powered by the battery.

Japanese Patent First Publication No. 2009-287459, assigned to the same assignee as that of this application, teaches controlling the inrush current appearing upon start of the electric motor of the engine starter to avoid the shutdown of the electric devices.

FIG. 4 illustrates an engine starting system, as disclosed in the above publication. A resistor 120 is disposed in an electric power supply path through which electric current is supplied from a battery 100 to an electric motor 110. A motor relay 130 short-circuits ends of the resistor 120. A timer 140 controls the time when the motor relay 130 is to be excited or closed. Specifically, the timer 140 determines a time lag between excitation of an electromagnetic switch 150 and that of the motor relay 130 so that contacts of the motor relay 130 are closed until the time lag has elapsed after main contacts of the electromagnetic switch 150 are closed.

Specifically, the timer 140 delays the excitation of the motor relay 130 until the time lag has elapsed after the electromagnetic switch 150 is excited, thereby causing the current to flow from the battery 100 to the motor 110 through the resistor 120 during a period of time from when the main contacts are closed until the relay contacts are closed. The current lowered by the resistor 120 is, therefore, supplied to the motor 110, so that the motor 110 runs at a lower speed.

When the time lag has elapsed, for example, after a pinion 160 meshes with a ring gear 170, the motor relay 130 is closed to short-circuit the ends of the resistor 120, thereby causing full voltage of the battery 100 to be applied to the motor 110. The current higher than that when the motor 110 is started is, thus, supplied to the motor 110, so that the motor 110 runs at a higher speed.

The structure of FIG. 4, however, has the following drawback.

The main contacts of the electromagnetic switch 150 are connected in series with the relay contacts of the motor relay 130. The turning on of the motor relay 130 to short-circuit the ends of the resistor 120 after the start of the motor 110, thus, the current to flow through the relay contacts while bypassing the resistor 120, which leads to a great drop in voltage to be applied to the motor 110 because the contacts (i.e., electric resistors) are greater than those in typical engine starting systems which are not equipped with the motor relay 130. This adversely affects the startability of the engine.

When the resistor 120 is short-circuited to apply the full voltage of the battery 100 to the motor 110, the current passes through the relay contacts of the motor relay 130, thus requiring the need for the motor relay 130 to have substantially the same capacity as that of the main contacts of the electromagnetic switch 150. This results in an increase in total production cost of the engine starting system.

SUMMARY

It is therefore an object of the invention to provide an engine starting apparatus which includes a resistor to lower a starting current for an electric motor and a motor relay to supply current to the motor without passing through the resistor after the start of the motor in order to minimize a voltage drop caused by the motor relay to ensure the stability in starting an engine.

According to one aspect of an embodiment, there is provided an engine starting apparatus which may be employed in automotive vehicles. The engine starting apparatus comprises: (a) an electric motor which is supplied with electric power from a battery to produce torque for starting an engine; (b) a first power supply path extending from the battery to the electric motor; (c) a second power supply path extending from the battery to the electric motor in parallel to the first power supply path; (d) a starter electromagnetic switch which has main contacts disposed in the first power supply path, when the main contacts are closed, electric current being supplied through the first power supply path to the electric motor at is a full voltage of the battery; (e) a resistor disposed in the second power supply path; (f) a motor relay which has relay contacts disposed in series with the resistor in the second power supply path; and (g) a controller which controls operations of the starter electromagnetic switch and the motor relay when it is required to start the engine through the electric motor. The controller delays a time when the starter electromagnetic switch is to be excited to close the main contacts to supply the electric current to the electric motor at the full voltage until a given time lag has elapsed after the motor relay is excited to close the relay contacts to supply electric current to the electric motor through the resistor.

Specifically, the first power supply path in which the main contacts are disposed and the second power supply path in which the relay contacts are disposed extend parallel to each other. The resistor is disposed in series with the relay contact in the second power supply path. When the motor relay is turned on to close the relay contacts, the current will continue to flow from the battery to the motor through the second power supply path until the main contacts are closed. The current, as lowered by the resistor, is supplied to the motor, so that the motor runs at a speed lower than a rated speed. After a lapse of the time lag, the controller turns on the starter electromagnetic switch to close the main contacts, the full voltage will be applied to the motor through the first power supply path bypassing the second power supply path, thus causing current higher than that flowing through the second power supply path to start the motor to be supplied to the motor, so that the motor runs at a higher speed (i.e., the rated speed).

As described above, when the main contacts are closed by the starter electromagnetic switch, it will cause the current to flow to the motor through the first power supply path without passing through the second power supply path. In other words, when it is required to apply the full voltage to the motor to run the motor at the rated speed, the current does not pass through the relay contacts, thus resulting in no voltage drop, which ensures the stability in starting the engine.

The relay contacts of the motor relay are connected in series with the resistor, thus causing the current flowing to the motor when the relay contacts are closed to be lower than that flowing through the first power supply path when the full voltage of the battery is applied to the motor. In other words, the current, as lowered by the resistor, flows to start the motor, thus permitting the motor relay to have a contact capacity smaller than that in the prior art structure, as discussed in the introductory part of this application. This results in a decrease in total production cost of the engine starting apparatus.

In the preferred mode, the motor relay is connected to the second power supply path through a first and a second external terminal, wherein the relay contacts include a first fixed contact connected electrically to the first external terminal, a second fixed contact connected electrically to the second external terminal, and a movable contact working to open and close the first and second fixed contacts electrically. The resistor is disposed inside the motor relay in electrical connection between the first external terminal and the first fixed contact or between the second external terminal and the second fixed contact.

Specifically, the resistor is installed inside a casing of the motor relay. In other words, the resistor is disposed free from direct contact with flammable objects existing outside the casing, thus ensuring the stability in operation of the resistor when the resistor continues to be energized for a long time so that it glows.

Additionally, the casing of the motor relay avoids adhesion of moisture to the resistor, thus resulting in improvement of durability of the resistor.

The resistor may be disposed in an empty space inside the casing of the motor relay, thus eliminating the need for using the large sized motor relay without sacrificing the mountablity of the motor relay in the vehicle.

The starter electromagnetic switch may be equipped with an exciting coil and a plunger. When excited, the exciting coil produces a magnetic attraction which moves the plunger in the exciting coil in an axial direction of the exciting coil to bring a pinion joined to the electric motor into engagement with a ring gear coupled to the engine and close the main contacts. This structure permits a typical electromagnetic switch to be used as it is, thus providing the engine starting apparatus without need for altering an engine starter circuit greatly.

The starter electromagnetic switch may include a pinion-moving solenoid and a main contact open/close solenoid. When excited, the pinion-moving solenoid produces a magnetic attraction to move a pinion joined to the electric motor toward a ring gear coupled to the engine. When excited, the main contact open/close solenoid produces a magnetic attraction to close the main contacts. The controller works to control operations of the pinion-moving solenoid and the main contact open/close solenoid independently of each other.

Specifically, the movement of the pinion to the ring gear of the engine and the closing of the main contacts are achieved independently of each other. In other words, the pinion-moving solenoid and the main contact open/close solenoid are controlled in operation independently of each other. The engine starting apparatus may, therefore, be used with an automatic engine stop/restart system (also called an idle stop system) as well as typical engine starting systems which start the engine when an engine start key is operated manually.

The pinion-moving solenoid and the main contact open/close solenoid may be aligned with each other in an axial direction thereof and disposed inside a single casing. This ensures as better mountability of the starter electromagnetic switch as typical electromagnetic switch.

The pinion-moving solenoid and the main contact open/close solenoid may alternatively be disposed one in each of casings. This permits, for example, only the main contact open/close solenoid to be replaced without need for opening the casing for the pinion-moving solenoid, thus resulting in a decrease in running cost of the engine starting apparatus. The pinion-moving solenoid may be made of most of parts of typical electromagnetic switches, while the main contact open/close solenoid may be implemented by general-purpose electromagnetic relays, thus resulting in a decrease in total production cost of the engine starting apparatus.

The controller may be disposed inside or outside the starter electromagnetic switch.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
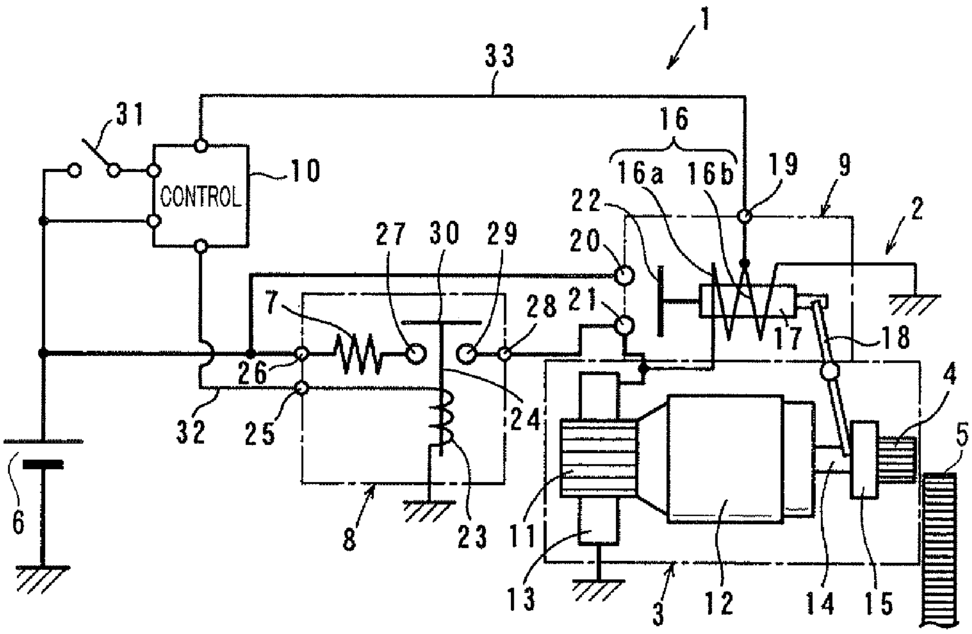
FIG. 1 is a circuit diagram which illustrates an engine starting system according to the first embodiment.

Referring to the drawings, wherein like reference numbers refer to like parts in several views, particularly to FIG. 1, there is shown an engine starting system 1 according to the first embodiment which may be used in automotive vehicles.

The engine starting system 1 includes a starter 2, a resistor 7, a motor relay 8, and a controller 10. The starter 2 is equipped with an electric motor 3 which produces and transmits torque to a ring gear 5 through a pinion 4 to start an internal combustion engine (not shown) mounted in an automotive vehicle. The ring gear 5 is coupled mechanically to an output shaft (i.e., a crankshaft) of the engine. The resistor 7 serves to lower electric current to be supplied from a battery 6 to the motor 3 through a motor circuit (which will be described later in detail) when it is required to turn on the motor 3. The motor relay 8 switches between electric paths to supply the current to the motor 3 while bypassing the resistor 7 after the motor 3 is turned on. The controller 10 works to delay the start of an operation of an electromagnetic switch 9 (serving as a starter electromagnetic switch) until after the start of an operation of the motor relay 8.

The motor 3 is of a typical commutator type which is equipped with a magnetic field (not shown) formed by permanent magnets or electromagnets, the armature 12 with a commutator 11, and brushes 13 riding on the outer periphery of the commutator 11.

The motor circuit has a first power supply path and a second power supply path through which the current is supplied from the battery 6 to the motor 3. Specifically, the first power supply path serves to supply the current to the motor 3 at a full voltage of the battery 6. The second power supply path has the resistor 7 installed therein. The first power supply path and the second power supply path extend in parallel to each other between the battery 6 and the motor 3.

The pinion 4 is fit on an output shaft 14 joined to an armature shaft of the motor 3 along with a clutch 15. The pinion 14 is movable along a length of the output shaft 14. Between the armature shaft and the output shaft 14, a speed reducer such as a planetary gear reducer may be disposed to reduce the speed of the armature 12 to increase torque outputted by the motor 3.

The clutch 15 works as a one-way clutch to transmit the torque of the output shaft 14 of the motor 3 to the pinion 4 and block the transmission of torque from the pinion 4 to the output shaft 14 when the speed of the pinion 4 exceeds that of output shaft 14 upon start up of the engine.

The electromagnetic switch 9 includes an exciting coil 16 and a plunger 17 disposed inside the exciting coil 16. When energized electrically, the exciting coil 16 produces a magnetic attraction to move the plunger 17 in an axial direction of the exciting coil 16 (i.e., a lateral direction, as viewed in the drawing). The movement of the plunger 17 will cause main contacts (which will be described later in detail) disposed in the first power supply path to be closed and the pinion 4 to be pushed toward the engine along with the clutch 15 through a shift lever 18.

The exciting coil 16 is made up of an attracting coil 16*a* and a holding coil 16*b*. The attracting coil 16*a* is connected at one of ends thereof to a switch terminal 19 secured to a resin cover (not shown) of the electromagnetic switch 9 and at the other end to an M-terminal bolt 21 which will be described later in detail. The holding coil 16*b* is connected at one of ends thereof to the switch terminal 10 and at the other end to ground through a yoke of the electromagnetic switch 9.

The main contacts are a pair of fixed contacts and a movable contact 22. The fixed contacts are connected to the first power supply path through a B-terminal bolt 20 and the M-terminal bolt 21, respectively. The movable contact 22 is to be moved by the movement of the plunger 17 to open or close the fixed contacts electrically. Specifically, when the movable contact 22 is brought into abutment with the fixed contacts, the fixed contacts are electrically connected together, that is, placed in an on-state. When the movable contact 22 is moved away from the fixed contacts, the fixed contacts are electrically disconnected from each other, that is, placed on an off-state. The fixed contacts may be formed integrally with or separately from heads of the B-terminal bolt 20 and the M-terminal bolt 21, respectively. The fixed contacts and the B- and M-terminal bolts 20 and 21 are indicated by “o” in FIG. 1 for the brevity of illustration.

The B-terminal bolt 20 and the M-terminal bolt 21 have the heads disposed inside the resin cover and externally threaded cylindrical bodies extending outside the resin cover through holes. The B-terminal bolt 20 and the M-terminal bolt 21 are secured to the resin cover through washers.

The B-terminal bolt 20 is electrically connected to a positive terminal of the battery 6 through an electrical cable. The M-terminal bolt 21 is electrically connected to the positive (+) brush 13 through a motor lead. In the case where the field of the motor 3 is made of an electromagnet (or a field winding), the M-terminal bolt 21 may be connected to the electromagnet.

The motor relay 8 is equipped with a relay coil 23 and a movable core 24. When energized electrically, the relay coil 23 works as an electromagnet. When the relay coil 23 is energized or deenergized, the movable core 24 moves inside the relay coil 23 in an axial direction thereof (i.e., a vertical direction, as viewed in the drawing). The movement of the movable core 24 will cause relay contacts (which will be described later in detail) to be opened or closed. The relay contacts are disposed in the second power supply path.

The relay coil 23 is connected at one of ends thereof to a switch terminal 25 secured to a resin cover (not shown) of the motor relay 8 and at the other end to ground through a yoke of the motor relay 8.

The relay contacts include fixed contacts 27 and 29 and a movable contact 30. The fixed contact 27 is electrically connected to a first external terminal 26. The fixed contact 29 is electrically connected to a second external terminal 28. The movable contact 30 is to be moved by the movement of the movable core 24 to open or close the fixed contacts 27 and 29 electrically. Specifically, when the movable contact 30 is brought into abutment with the fixed contacts 27 and 29, the fixed contacts 27 and 29 are electrically connected together, that is, placed in an on-state. When the movable contact 30 is moved away from the fixed contacts 27 and 29, the fixed contacts 27 and 29 are electrically disconnected from each other, that is, placed on an off-state.

Specifically, the motor relay 8 is of a normally open type in which when the relay coil 23 is deenergized, the fixed contacts 27 and 29 are placed on the off-state, while when the relay coil 23 is energized, the fixed contacts 27 and 28 are placed on the on-state.

The first and second external terminals 26 and 28 are implemented by the same bolts as the B-terminal bolt 20 and the M-terminal bolt 21 of the electromagnetic switch 9. Specifically, the first and second external terminals 26 and 28 have externally threaded cylindrical bodies extending outside the resin cover (not shown) of the motor relay 8 through holes. The first and second external terminals 26 and 28 are secured to the resin cover through washers. The first external terminal 26 is electrically connected to the positive terminal of the battery 6 through an electrical cable. The second external terminal 28 is electrically connected to the M-terminal bolt 21 of the electromagnetic switch 9 through an electrical cable.

The resistor 7 is disposed inside a casing (e.g., the resin cover) of the motor relay 8 and connected, as illustrated in FIG. 1, between the first external terminal 26 and the fixed contact 27.

When a start switch 31 is turned on to start the engine, the controller 10 is turned on by the supply of the electric power from the battery 6 and supplies an exciting current both to the relay coil 23 through the electrical lead 32 connected to the switch terminal 25 of the motor relay 8 and to the exciting coil 16 through the electric lead 33 connected to the switch terminal 19 of the electromagnetic switch 9.

The controller 10 determines an on-time when the exciting coil 16 is to be excited based on an on-time when the relay coil 23 is to be excited so that the relay contacts are turned on prior to turning on of the main contacts. Specifically, the controller 10 is equipped with a timer which delays the start of the operation of the electromagnetic switch 9 until after the start of the operation of the motor relay 8 so as to develop a lag time between the excitations of the relay coil 23 and the exciting coil 16. This enables the length of time the current flows through the resistor 7, in other words, the current flows to the motor 3 through the second power supply path when the motor 3 is turned on to be controlled.

The operation of the engine starting system 1 will be described below in detail.

When it is required to start the engine, that is, the start switch 31 is turned on, the exciting current is supplied to the relay coil 23 of the motor relay 8 through the controller 10, so that the relay contacts are closed. This causes the current to flow from the battery 6 to the motor 3 through the resistor 7. The current supplied to the motor 3 is, therefore, lowered by the resistor 7, so that the motor 3 rotates at a speed lower than a rated speed.

After a lapse of the lag time, as set by the controller 10, the controller 10 excites the exciting coil 16 of the electromagnetic switch 9 to close the main contacts, so that the first power supply path is creased which bypasses the resistor 7. The full voltage of the battery 6 is, thus, applied to the motor 3 through the first power supply path. This causes the current higher than that when the motor 3 is started to be supplied to the motor 3, so that the motor 3 rotates at a higher speed (i.e. the rated speed).

The electromagnetic switch 9 is so designed that the main contacts are closed slightly behind the time when the pinion 4 moves and hits the ring gear 5. The pinion gear 4 is, therefore, brought into engagement with the ring gear 5 while the motor 3 is rotating at the low speed.

The above operation minimizes the inrush current which will appear when the motor 3 is started, thus avoiding an instantaneous great drop in voltage at the terminal of the battery 6 which may result in shutdown of other electrical devices such as indicators or audio players installed in the vehicle which are to be powered by the battery 6. The pinion 4 is, as described above, brought by the controller 10 into engagement with the ring gear 5 while the motor 3 is rotating at the low speed, thereby resulting in a decrease in magnitude of mechanical impact arising from the engagement of the pinion 4 with the ring gear 5. This results in a decrease in wear of the pinion 4 and the ring gear 5.

The engine starting system 1 of this embodiment offers the following advantages.

The engine starting system 1 has the first power supply path equipped with the main contacts and the second power supply path equipped with the relay contacts. The first and second power supply paths are in parallel to each other. The second power supply path has the resistor 7 disposed in series with the relay contacts. When the main contacts are closed a given period of time after the relay contacts are closed, the current does not flow through the second power supply path, but flows through the first power supply path to the motor 3. The full voltage of the battery 6 is, thus, applied to the motor 3. In other words, the current does not flow through the relay contacts to run the motor 3 on the full voltage, thus resulting in no drop in voltage at the relay contacts of the motor relay 8 when the operation of the motor 3 is switched from the low-speed mode to the high-speed mode. This ensures the stability in starting the engine.

The motor relay 8 has the relay contacts connected in series with the resistor 7, thus causing the current flowing to the motor 3 when the relay contacts are closed to be lower than that flowing through the first power supply path to apply the full voltage of the battery 6 to the motor 3. In other words, the current, as lowered by the resistor 7, flows through the second power supply path, thus permitting the motor relay 8 to be used which is smaller in contact capacity, which results in a decrease in total production cost of the engine starting system 1.

The resistor 7 is installed inside the casing of the motor relay 8. In other words, the resistor 7 is disposed free from direct contact with flammable objects existing outside the casing, thus ensuring the stability in operation of the resistor 7 when the resistor 7 continues to be energized for a long time so that it glows.

Additionally, the casing of the motor relay 8 avoids adhesion of moisture to the resistor 7, thus resulting in improvement of durability of the resistor 7.

The resistor 7 may be disposed in an empty space inside the casing (e.g., the resin cover) of the motor relay 8, thus eliminating the need for using the large sized motor relay 8 without sacrificing the mountablity of the motor relay 8 in the vehicle.

The above described structure of the engine starting system 1 permits typical electromagnetic switches such as one disclosed in the Japanese Patent Publication, as discussed in the introductory part of this application, to be used as they are, thus providing the engine starting system 1 without need for altering an engine starter circuit greatly.

Figure 2:
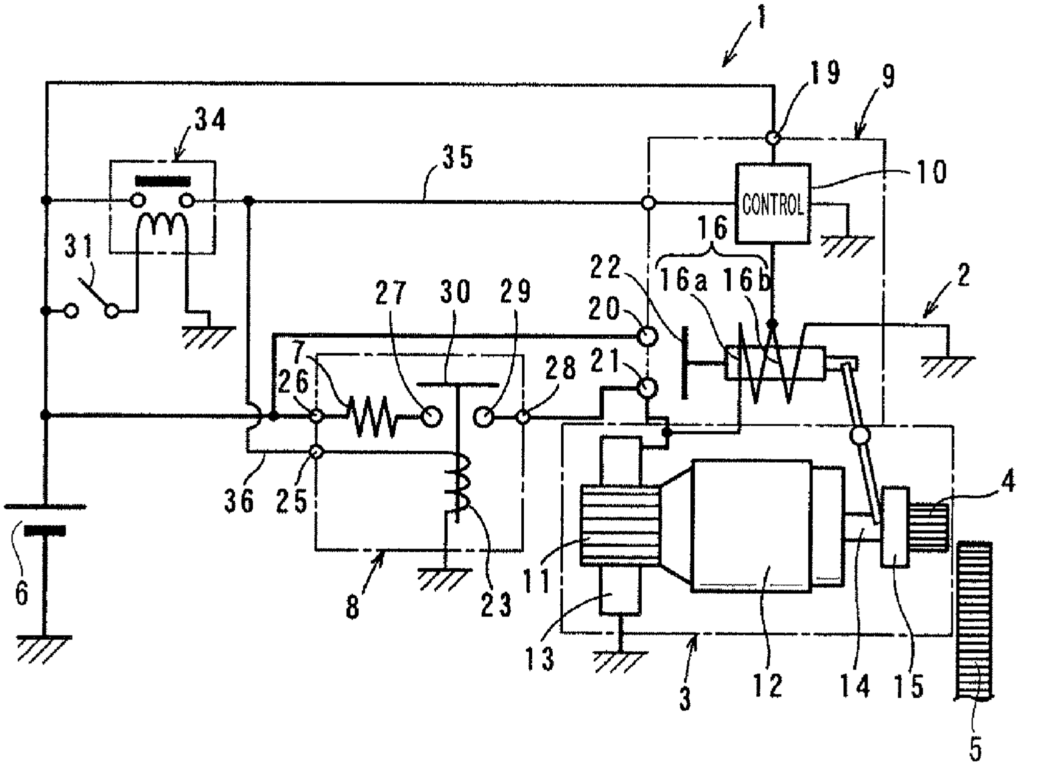
FIG. 2 is a circuit diagram which illustrates an engine starting system according to the second embodiment.

FIG. 2 illustrates the engine starting system 1 according to the second embodiment. The same reference numbers as employed in the first embodiment refer to the same parts, and explanation thereof in detail will be omitted here.

The controller 10 is built in the electromagnetic switch 9. Specifically, the controller 10 is disposed in an inner chamber of the casing of the electromagnetic switch 9. The casing may be made of resin. The controller 10 is electrically joined both to a junction of the attracting coil 16*a* and the holding coil 16*b* and to the switch terminal 19. The controller 10 is also joined to the battery 6 through a power supply line 35 in which an external relay 34 is disposed.

When the start switch 31 is turned on, a coil of the external relay 34 is excited by the power from the battery 6, so that contacts thereof are closed. The external relay 34 and the switch terminal 25 of the motor relay 8 are connected through an electric lead 36.

Specifically, the electric lead 36 extends from a portion of the power supply line 35 (i.e., – potential side) which is away from the battery 6 across the external relay 34 to the relay coil 23 to excite the relay coil 23.

The operation of the engine starting system 1 of the second embodiment will be described below.

When it is required to start the engine, and the start switch 31 is turned on, the external relay 34 is closed to supply the power from the battery 6 to the relay coil 23 of the motor relay 8. The motor relay 8 is then closed, so that the power is supplied from the battery 6 to the motor 3 through the resistor 7. The current, as lowered by the resistor 7, flows to the motor 3, thus causing the motor 3 to rotate at a speed lower than the rated speed.

After a lapse of the lag time, as set by the controller 10, the exciting coil 16 of the electromagnetic switch 9 is excited to close the main contacts, so that the first power supply path is created which bypasses the resistor 7. The full voltage of the battery 6 is, thus, applied to the motor 3 through the first power supply path. The current higher than that when the motor 3 is started is, therefore, supplied to the motor 3, so that the motor 3 rotates at a higher speed (i.e. the rated speed).

The above operation, like in the first embodiment, minimizes the inrush current which will appear usually when the motor 3 is started, thus avoiding an instantaneous great drop in voltage at the terminal of the battery 6 which may result in shutdown of other electrical devices installed in the vehicle which are to be powered by the battery 6. The pinion 4 is brought by the controller 10 into engagement with the ring gear 5 while the motor 3 is rotating at the low speed, thereby resulting in a decrease in magnitude of mechanical impact arising from the engagement of the pinion 4 with the ring gear 5. This results in a decrease in wear of the pinion 4 and the ring gear 5.

The electromagnetic switch 9 has the controller 10 disposed therein, thus eliminating the need for a separate casing for the controller 10 and resulting in a decrease in total production cost of the engine starting system 1. The electrical connection between the controller 10 and the exciting coil 16 is achieved inside the casing. The casing ensures the liquid-tight sealing for the electromagnetic switch 9. This improves the reliability in operation and durability of the controller 10.

Figure 3:
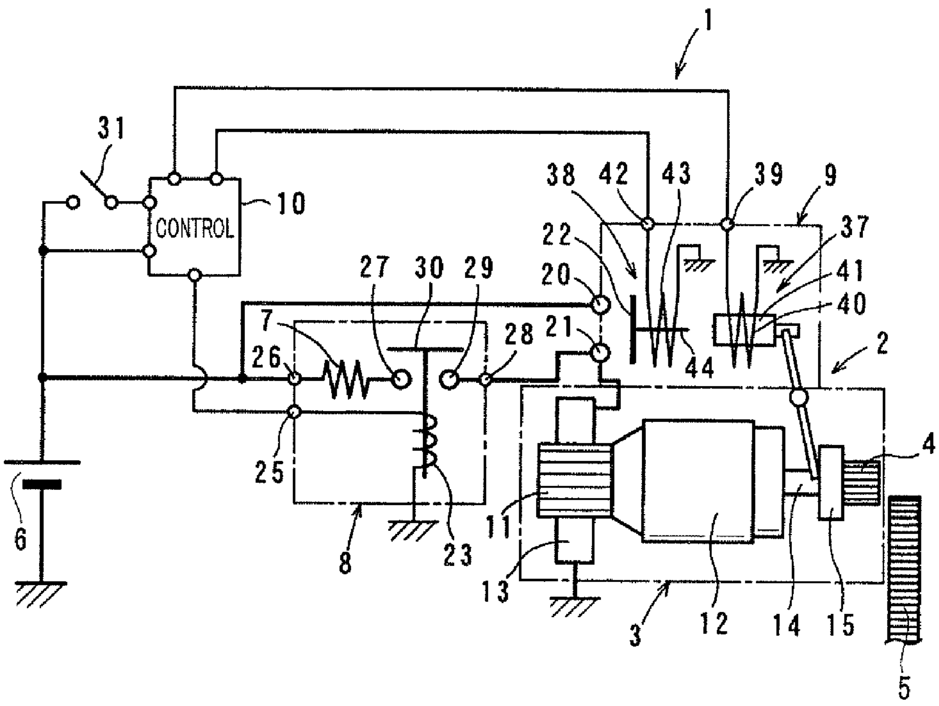
FIG. 3 is a circuit diagram which illustrates an engine starting system according to the third embodiment.
Figure 4:
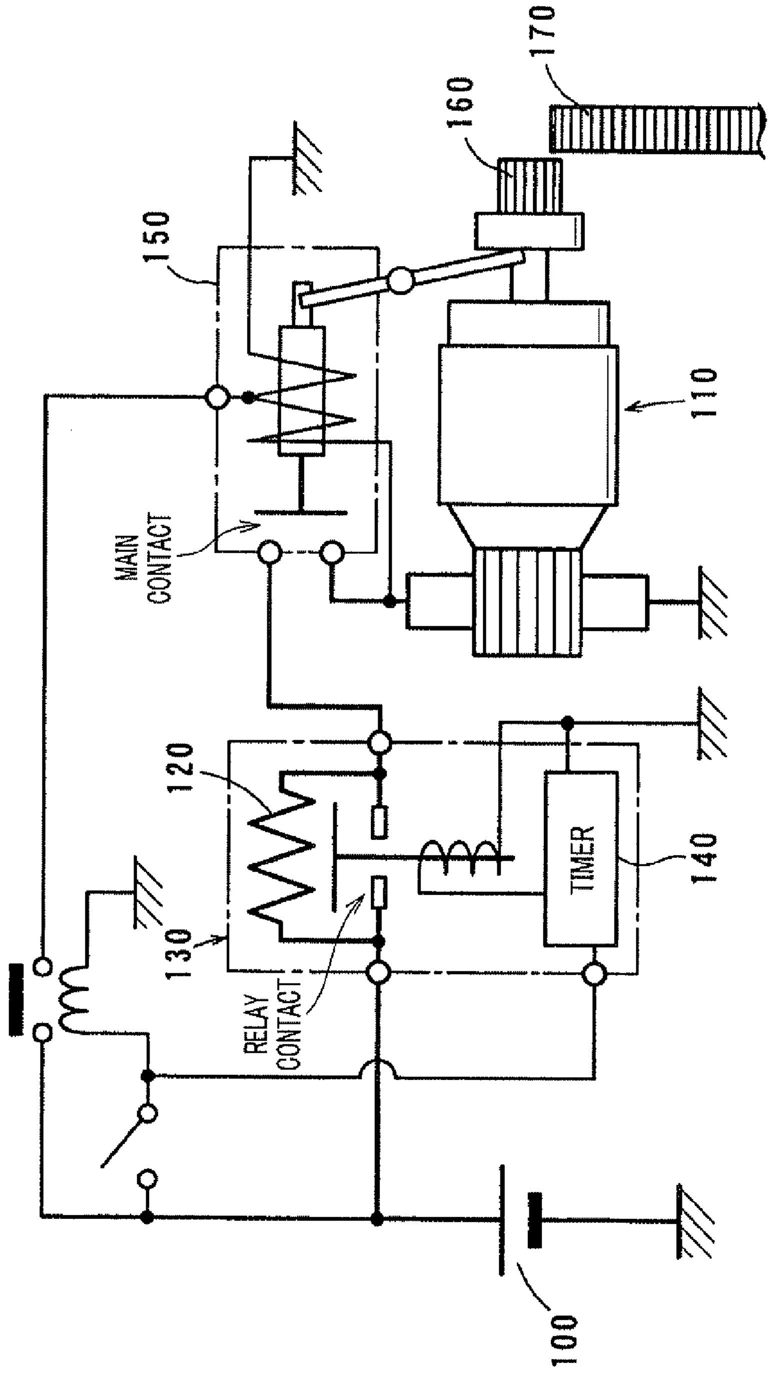
FIG.4 (PRIOR ART)
FIG. 4 is a circuit diagram which illustrates a conventional engine starting system.

FIG. 3 illustrates the engine starting system 1 according to the third embodiment. The same reference numbers as employed in the first embodiment refer to the same parts, and explanation thereof in detail will be omitted here.

The electromagnetic switch 9 is, as can be seen from the drawing, made of up two discrete solenoids.

Specifically, the electromagnetic switch 9 includes a pinion-moving solenoid 37 and a main contact open/close solenoid 38. The pinion-moving solenoid 37 works to move the pinion 4 of the starter 2 to the ring gear 5. The main contact open/close solenoid 38 works to open or close the main contacts. The operations of the pinion-moving solenoid 37 and the main contact open/close solenoid 38 are controlled by the controller 10 independently from each other.

The pinion-moving solenoid 37 and the main contact open/close solenoid 38 are aligned with each other in an axial direction thereof and disposed inside the casing of the electromagnetic switch.

The pinion-moving solenoid 37 is equipped with a first coil 40 and a plunger 41. The first coil 40 is electrically connected to the controller 10 through a first switch terminal 39. When the first coil 40 is excited, it produces a magnetic attraction to move the plunger 41 in an axial direction of the plunger 41 in the first coil 40. The movement of the plunger 41 causes the pinion 4 to be advanced to the engine (i.e., the ring gear 5) together with the clutch 15.

The main contact open/close solenoid 38 is equipped with a second coil 43 and a movable core 44. The second coil 43 is electrically connected to the controller 10 through a second switch terminal 42. When the second coil 43 is excited, it produces a magnetic attraction to move the movable core 44 in an axial direction thereof in the second coil 43 to close the main contacts.

When start switch 31 is turned on, the controller 10 is, like in the first embodiment, activated by the power from the battery 6 and then supplies the current to excite the relay coil 23 of the motor relay 8. The controller 10 also supplies the current both to the first coil 40 of the pinion-moving solenoid 38 and to the second coil 43 of the main contact open/close solenoid 38. The controller 10 creates the lag time between the excitation of the relay coil 23 and that of the second coil 43. In other words, the controller 10 closes the relay contacts and then closes the main contacts, that is, delays the time when the second coil 43 is to be excited behind the time when the relay coil 23 is to be excited.

The controller 10 may also delay the time when the second coil 43 is to be excited until after the first coil 40 is to be excited so that the main contacts are closed after the pinion 4 moves and meshes with the ring gear 5. Specifically, the controller 10 may excite the first coil 40 synchronously with the excitation of the relay coil 23 and delay the excitation of the second coil 43 until after the excitation of the first coil 40. This causes the pinion 4 to move and hit the ring gear 5 while the motor 3 is running at a low speed, in other words, before the main contacts are closed, thereby ensuring the stability in achieving the engagement of the pinion 4 with the ring gear 5 during the low-speed rotation of the motor 3. This results in decreases in magnitude of mechanical impact arising from the engagement of the pinion 4 with the ring gear 5 and wear of the pinion 4 and the ring gear 5.

The engine starting system 1 of this embodiment is, as described above, engineered to control the operations of the pinion-moving solenoid 37 and the main contact open/close solenoid 38 independently of each other and thus may conversely start to move the pinion 4 after the main contacts are closed, that is, delay the excitation of the first coil 40 until after the excitation of the second coil 43. This operation is useful in an automatic engine stop/restart system (also called an idle stop system) for automotive vehicles. Specifically, when an engine restart request is made before the engine is stopped completely, the controller 10 closes the main contacts to run the motor 3 at the higher speed and then brings the pinion 4 into engagement with the ring gear 5, thereby restarting the engine quickly without need for waiting for a complete stop of the engine.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The resistor 7 is disposed inside the casing of the motor relay 8 in electric connection with the first external terminal 26 and the fixed contact 27, but may be connected between the second external terminal 28 and the fixed contact 29.

The resistor 7 may also be disposed outside the casing of the motor relay 8.

The pinion-moving solenoid 37 and the main contact open/close solenoid 38 in the third embodiment may alternatively be disposed in separate casings, respectively. This permits, for example, only the main contact open/close solenoid 38 to be replaced without need for opening the casing for the pinion-moving solenoid 37, thus resulting in a decrease in running cost of the engine starting system 1. The pinion-moving solenoid 37 may be made of most of parts of typical electromagnetic switches, while the main contact open/close solenoid 38 may be implemented by general-purpose electromagnetic relays, thus resulting in a decrease in total production cost of the engine starting system 1.

What is claimed is:

1. An engine starting apparatus comprising:

an electric motor which is supplied with electric power from a battery to produce torque for starting an engine;

a first power supply path extending from the battery to the electric motor;

a second power supply path extending from the battery to the electric motor in parallel to the first power supply path;

a starter electromagnetic switch which has main contacts disposed in the first power supply path, when the main contacts are closed, electric current being supplied through the first power supply path to the electric motor at a full voltage of the battery;

a resistor disposed in the second power supply path;

a motor relay which has relay contacts disposed in series with the resistor in the second power supply path; and a controller which controls operations of the starter electromagnetic switch and the motor relay when it is required to start the engine through the electric motor, the controller delaying a time when the starter electromagnetic switch is to be excited to close the main contacts to supply the electric current to the electric motor at the full voltage until a given time lag has elapsed after the motor relay is excited to close the relay contacts to supply electric current to the electric motor through the resistor.

2. An engine starting apparatus as set forth in claim 1, wherein the motor relay is connected to the second power supply path through a first and a second external terminal, wherein the relay contacts include a first fixed contact connected electrically to the first external terminal, a second fixed contact connected electrically to the second external terminal, and a movable contact working to open and close the first and second fixed contacts electrically, and wherein the resistor is disposed inside the motor relay in electrical connection between the first external terminal and the first fixed contact or between the second external terminal and the second fixed contact.

3. An engine starting apparatus as set forth in claim 1, wherein the starter electromagnetic switch is equipped with an exciting coil and a plunger, when excited, the exciting coil producing a magnetic attraction which moves the plunger in the exciting coil in an axial direction of the exciting coil to bring a pinion joined to the electric motor into engagement with a ring gear coupled to the engine and close the main contacts.

4. An engine starting apparatus as set forth in claim 1, wherein the starter electromagnetic switch includes a pinion-moving solenoid and a main contact open/close solenoid, when excited, the pinion-moving solenoid producing a magnetic attraction to move a pinion joined to the electric motor toward a ring gear coupled to the engine, when excited, the main contact open/close solenoid producing a magnetic attraction to close the main contacts, and wherein the controller works to control operations of the pinion-moving solenoid and the main contact open/close solenoid independently of each other.

5. An engine starting apparatus as set forth in claim 4, wherein the pinion-moving solenoid and the main contact open/close solenoid are aligned with each other in an axial direction thereof and disposed inside a casing.

6. An engine starting apparatus as set forth in claim 4, wherein the pinion-moving solenoid and the main contact open/close solenoid are disposed one in each of casings.

7. An engine starting apparatus as set forth in claim 1, wherein the controller is disposed outside the starter electromagnetic switch.

8. An engine starting apparatus as set forth in claim 1, wherein the controller is disposed inside the starter electromagnetic switch.

* * * * *